United States Patent
Park et al.

(10) Patent No.: US 12,230,835 B2
(45) Date of Patent: Feb. 18, 2025

(54) ELECTRODE ASSEMBLY COMPRISING COATING PART OF DIFFERENT COLORS AND METHOD OF MANUFACTURING THE SAME

(71) Applicant: LG ENERGY SOLUTION, LTD., Seoul (KR)

(72) Inventors: Chan Woo Park, Daejeon (KR); Kwan Hong Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 638 days.

(21) Appl. No.: 17/601,192

(22) PCT Filed: Apr. 14, 2020

(86) PCT No.: PCT/KR2020/005001
§ 371 (c)(1),
(2) Date: Oct. 4, 2021

(87) PCT Pub. No.: WO2020/213910
PCT Pub. Date: Oct. 22, 2020

(65) Prior Publication Data
US 2022/0200099 A1 Jun. 23, 2022

(30) Foreign Application Priority Data
Apr. 16, 2019 (KR) .................. 10-2019-0044326

(51) Int. Cl.
*H01M 50/449* (2021.01)
*H01M 10/0585* (2010.01)

(52) U.S. Cl.
CPC ..... *H01M 50/449* (2021.01); *H01M 10/0585* (2013.01)

(58) Field of Classification Search
CPC .............. H01M 50/449; H01M 10/0585
USPC .................... 429/144, 247, 248
See application file for complete search history.

(56) References Cited

U.S. PATENT DOCUMENTS

| | | |
|---|---|---|
| 2002/0182490 A1 | 12/2002 | Cho et al. |
| 2010/0281685 A1 | 11/2010 | Hori et al. |
| 2010/0285371 A1 | 11/2010 | Lee et al. |
| 2011/0176661 A1 | 7/2011 | Li et al. |

(Continued)

FOREIGN PATENT DOCUMENTS

| | | | |
|---|---|---|---|
| CN | 1393041 A | 1/2003 | |
| CN | 108711603 A | * 10/2018 | .......... H01M 50/403 |

(Continued)

OTHER PUBLICATIONS

Extended European Search Report issued by the European Patent Office dated Feb. 7, 2022 in a corresponding European patent application No. 20791670.1.

(Continued)

*Primary Examiner* — Sean P Cullen
(74) *Attorney, Agent, or Firm* — Morgan, Lewis & Bockius LLP

(57) ABSTRACT

Disclosed is an electrode assembly comprising two or more electrodes and a separator disposed between the electrodes, wherein the separator is provided a coating part having a color on a surplus part that is not in contact with the electrodes, and colors of the coating parts provided on the neighboring separators thereto are different from each other.

14 Claims, 7 Drawing Sheets

(56) References Cited

U.S. PATENT DOCUMENTS

| | | |
|---|---|---|
| 2014/0134472 A1 | 5/2014 | Kim |
| 2014/0212751 A1 | 7/2014 | Ku et al. |
| 2015/0228963 A1 | 8/2015 | Kim et al. |
| 2015/0236337 A1 | 8/2015 | Kim et al. |
| 2018/0145376 A1* | 5/2018 | Jo ....................... H01M 50/461 |

FOREIGN PATENT DOCUMENTS

| | | | |
|---|---|---|---|
| CN | 207938697 U | * | 10/2018 |
| JP | H05-109435 A | | 4/1993 |
| JP | 2002334689 A | * | 11/2002 |
| JP | 2005-228533 A | | 8/2005 |
| JP | 2007141590 A | * | 6/2007 |
| JP | 2010-504625 A | | 2/2010 |
| JP | 2016-103480 A | | 6/2016 |
| KR | 10-2010-0113111 | | 10/2010 |
| KR | 2011-0138718 A | | 12/2011 |
| KR | 10-1168650 B1 | | 7/2012 |
| KR | 2014-0004572 A | | 1/2014 |
| KR | 10-2016-0054219 A | | 5/2016 |
| KR | 10-2017-0036227 A | | 4/2017 |
| KR | 10-1750239 B1 | | 6/2017 |
| KR | 10-1808606 B1 | | 12/2017 |
| KR | 10-2018-0058370 A | | 6/2018 |

OTHER PUBLICATIONS

Office Action issued Aug. 26, 2023 for counterpart Chinese Patent Application No. 202080026303.4.
International Search Report (with partial translation) and Written Opinion issued in corresponding International Patent Application No. PCT/KR2020/005001, dated Jul. 3, 2020.

* cited by examiner

[FIG. 5]

FIG. 7
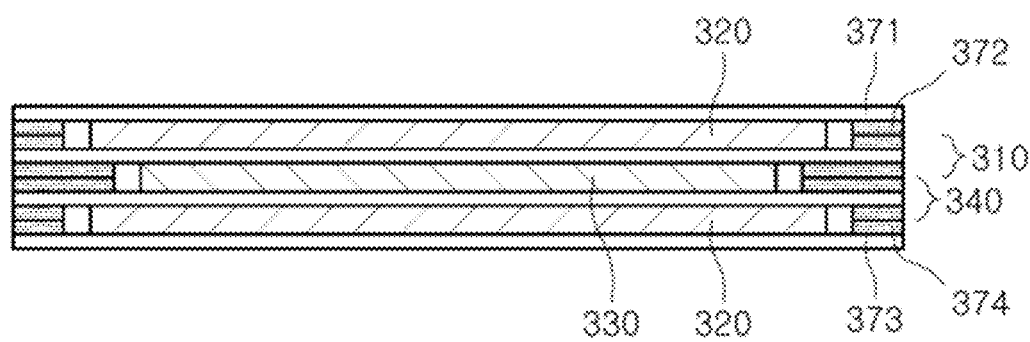
a
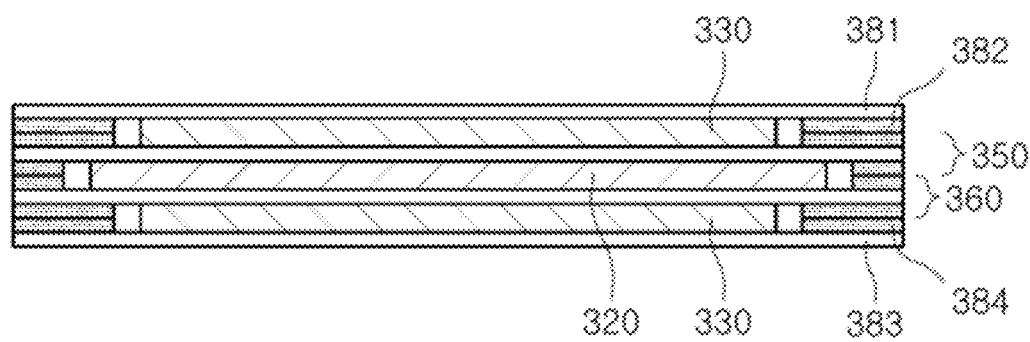
b

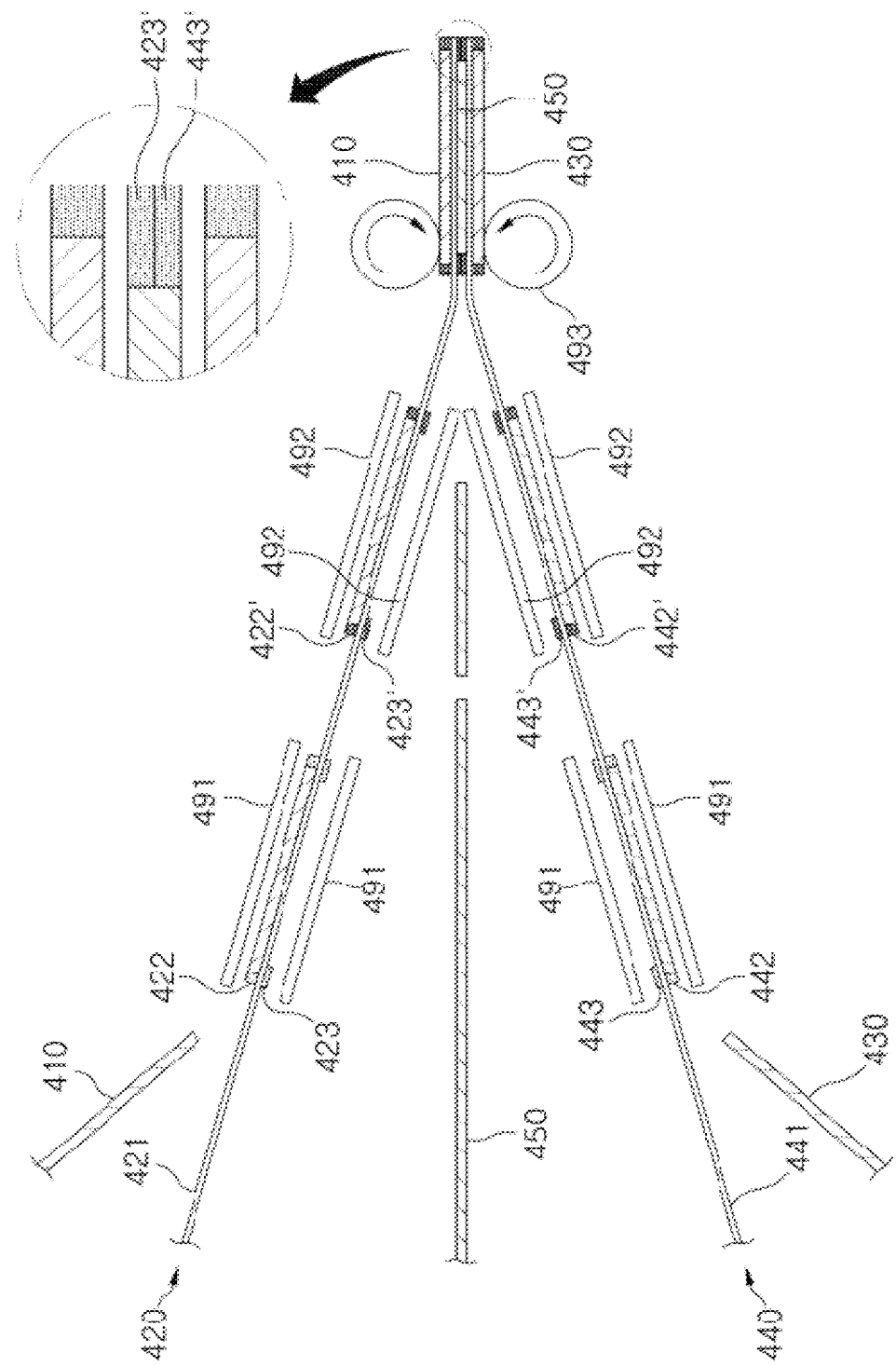
[FIG. 8]

ELECTRODE ASSEMBLY COMPRISING COATING PART OF DIFFERENT COLORS AND METHOD OF MANUFACTURING THE SAME

TECHNICAL FIELD

This application claims the benefit of priority to Korean Patent Application No. 2019-0044326 filed on Apr. 16, 2019, the disclosure of which is hereby incorporated by reference herein its entirety.

The present invention relates to an electrode assembly for secondary batteries and a method of manufacturing the same, particularly to an electrode assembly for secondary batteries in which a coating part including a dye is formed in a separator surplus part constituting the electrode assembly, the coating part having different colors applied to alternately arranged separators, and a method of manufacturing the same.

BACKGROUND ART

In recent years, with an increase in the demand for mobile electronic devices and wearable electronic devices, research has been actively conducted on lithium secondary batteries as energy sources for mobile electronic devices and wearable devices.

In particular, with the trends toward reducing the weight and miniaturization of electronic devices, the demand for thinning of lithium secondary batteries is increased. In addition, there is an increasing need for lithium secondary batteries having high energy density in order to use them as energy sources for high performance electronic devices.

In general, since a jelly-roll type electrode assembly used in cylindrical lithium secondary batteries and prismatic lithium secondary batteries has low battery efficiency compared to volume due to the characteristics of the winding structure, has difficulty reducing the thickness of the metal case, and is limited in increasing the thickness of the electrode assembly, there is a problem of low energy density.

On the other hand, a pouch-type lithium secondary battery having a structure in which a stacked-type electrode assembly is received in an aluminum laminate sheet can compensate for the disadvantage that space is wasted when using a jelly-roll electrode assembly, and thus there is an advantage that the energy density is relatively high and the shape can be easily modified.

However, when the stacked-type electrode assembly is manufactured in a structure in which the area of a separator is larger than the area of an electrode, an electrode located under the separator is obscured by the separator, so the stacking position may be misaligned, unlike the designed position.

In this case, it is difficult to align the positions of the electrodes, short circuits between different electrodes may occur, and an end of the relatively large electrode may be bent toward the relatively small electrode in the bonding process between the electrode and the separator.

In addition, there may be a problem that a bent electrode mixture layer is separated from an electrode current collector.

In this regard, Patent Document 1 discloses an electrode assembly having a structure in which an electrode plate support is coated on an outside surplus part, except for an inner surface portion where the electrode plate is located, in a separator having a size larger than that of a positive electrode and a negative electrode. However, in an electrode assembly including a plurality of positive and negative electrodes, a structure or method of laminating such that the center axes of the positive electrode and the negative electrode in the laminating direction are perfectly aligned is not disclosed.

Patent Document 2 relates to a pocketing electrode body comprising an electrode plate having a coating area coated with an electrode active material and a protrusion portion not coated with the electrode active material; separators disposed on both sides of the electrode plate to expose the protrusion portion; and an insulating polymer film interposed on at least a portion of an opposite edge of the separator in a state spaced apart from the electrode plate and having an adhesive layer capable of adhering the edge of the separator. In Patent Document 2, a negative electrode pocketing electrode body and a positive electrode pocketing electrode body are manufactured, but a solution to solve the misalignment problem when stacking them has not been proposed.

Patent Document 3 relates to an electrode assembly having a coating layer thicker than the thickness of a separator on both sides of a both side portion of a separator surplus part to prevent shrinkage of the separator, wherein the separator surplus part is configured to have a size of 5% to 12%, respectively, based on the width of the separator, wherein the coating layer is coated with a size of 50% to 90% on both sides of the separator based on the width of the separator surplus part on one side, and wherein the widths of the coating layers formed on both sides of the both side portion of the separator surplus part are different from each other or are identical to each other. In the state in which a positive electrode and a negative electrode are stacked, Patent Document 3 does not recognize a structure in which the central axes of the positive electrode and the negative electrode are perfectly aligned.

As described above, in the electrode assembly having a stacked structure with the separator interposed between the positive electrode and the negative electrode, there is a high need for a technology capable of preventing the stacked electrodes from protruding out of alignment by perfectly aligning the positive electrode central axis and the negative electrode central axis, and capable of easily checking the positional alignment of electrodes in the process of manufacturing the electrode assembly.

PRIOR ART DOCUMENT (Patent Document 1) Korean Patent Application Publication No. 2017-0036227 (2017 Apr. 3)
(Patent Document 2) Korean Patent No. 1168650 (2012 Jul. 19)
(Patent Document 3) Korean Patent No. 1750239 (2017 Jun. 19)

DISCLOSURE

Technical Problem

The present invention has been made in view of the above problems, and it is an object of the present invention to provide an electrode assembly, which is capable of preventing positional tolerances between stacked electrodes as the alignment of an electrode located under a separator can be easily confirmed in a stacked-type electrode assembly, and capable of preventing an end of the electrode from being deformed due to a coating part added to a surplus part of a separator substrate, and a method of manufacturing the same.

Technical Solution

In accordance with a first aspect of the present invention, the above and other objects can be accomplished by the provision of an electrode assembly comprising two or more electrodes, and a separator disposed between the electrodes, wherein the separator is provided with a coating part having a color on a surplus part of a separator substrate that is not in contact with the electrodes, and the color of the coating part is different from a color of a coating part provided on a neighboring separator thereto.

In accordance with a second aspect, there is provided the electrode assembly, wherein the coating part does not overlap with an immediately adjacent electrode, and is formed on the entire surplus part.

In accordance with a third aspect, there is provided the electrode assembly, wherein a thickness of the coating part is equal to or smaller than a thickness of the immediately adjacent electrode.

In accordance with a fourth aspect, there is provided the electrode assembly, wherein the separator has coating layers of the same color formed on both sides of the separator.

In accordance with a fifth aspect, there is provided the electrode assembly, wherein the coating part comprises a material that is cured by ultraviolet irradiation or heat.

In accordance with a sixth aspect, there is provided the electrode assembly comprising one or more unit cells, wherein the unit cell comprises a C-type bi-cell composed of a negative electrode, a first separator, a positive electrode, a second separator and a negative electrode; and an A-type bi-cell composed of a positive electrode, a second separator, a negative electrode, a first separator and a positive electrode.

In accordance with a seventh aspect, there is provided a method of manufacturing the electrode assembly, the method comprising (a) cutting a first electrode and binding the first electrode with an interval to a first surface of a first separator substrate which is unwound; (b) curing after coating a coloring material on a surplus part of the first surface of the first separator substrate which is not in contact with the first electrode; (c) simultaneously with step (a), cutting a second electrode and binding the second electrode with an interval to a second surface of a second separator substrate which is unwound; (d) simultaneously with step (b), curing after coating a coloring material on a surplus part of the second surface of the second separator substrate which is not in contact with the second electrode; (e) simultaneously with steps (b) and (d), curing after locating a position corresponding to the first electrode on a second surface of the first separator substrate and coating a coloring material on a virtual surplus part of the second surface of the first separator substrate; (f) simultaneously with steps (b) and (d), curing after locating a position corresponding to the second electrode on a first surface of the second separator substrate and coating a coloring material on a virtual surplus part of the first surface of the second separator substrate; (g) cutting and disposing a third electrode in an uncoated region of the second surface of the first separator substrate and an uncoated region of the first surface of the second separator substrate; (h) compressing the first electrode, the first separator, the third electrode, the second separator, and the second electrode; and (i) manufacturing a unit cell by cutting in coating regions of the first separator and the second separator, wherein steps (e) and (f) may be both or alternatively performed.

In accordance with an eighth aspect, there is provided the method of manufacturing the electrode assembly, wherein the sum of coating thicknesses of steps (e) and (f) is equal to a thickness of the third electrode.

In accordance with a ninth aspect, there is provided the method of manufacturing the electrode assembly, wherein only one of steps (e) or (f) is performed, and a coating thickness is equal to a thickness of the third electrode.

In accordance with a tenth aspect, there is provided the method of manufacturing the electrode assembly, wherein the total area of the first separator and the second separator is the same, an area of the third electrode is smaller than that of the first electrode and the second electrode, and an area of the virtual surplus part of steps (e) and (f) is larger than that of the surplus part of steps (b) and (d).

In accordance with an eleventh aspect, there is provided the method of manufacturing the electrode assembly, wherein the third electrode is a negative electrode when the first electrode and the second electrode are positive electrodes, or the third electrode is a positive electrode when the first electrode and the second electrode are negative electrodes.

In accordance with a twelfth aspect, there is provided the method of manufacturing the electrode assembly, wherein a color of the coating in steps (b) and (e) is a first color, and a color of the coating in steps (d) and (f) is a second color.

In accordance with a thirteenth aspect, there is provided the method of manufacturing the electrode assembly, wherein the first color and the second color are different colors.

DESCRIPTION OF DRAWINGS

FIG. 7 is a vertical sectional view showing a third embodiment of an electrode assembly.

FIG. 8 is a schematic view showing a process of manufacturing an electrode assembly.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Reference will now be made in detail to the preferred embodiments of the present invention, examples of which are illustrated in the accompanying drawings.

Figure 1:
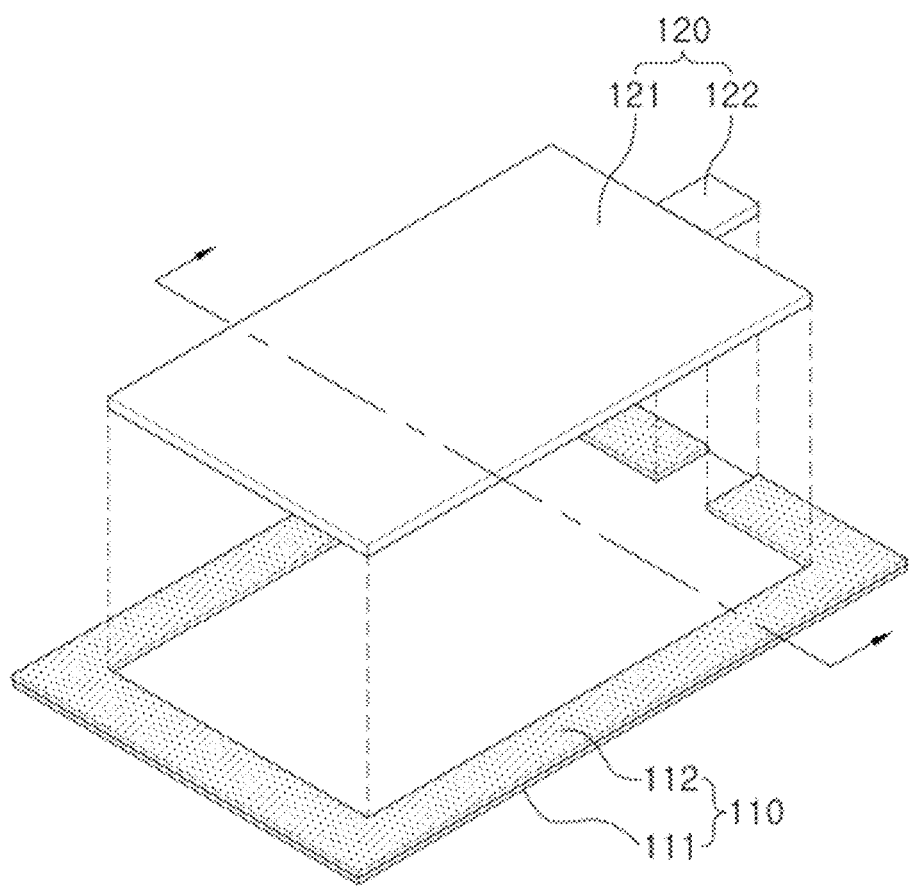
FIG. 1 is an exploded perspective view showing an electrode and a separator according to an embodiment of the present invention.
Figure 2:
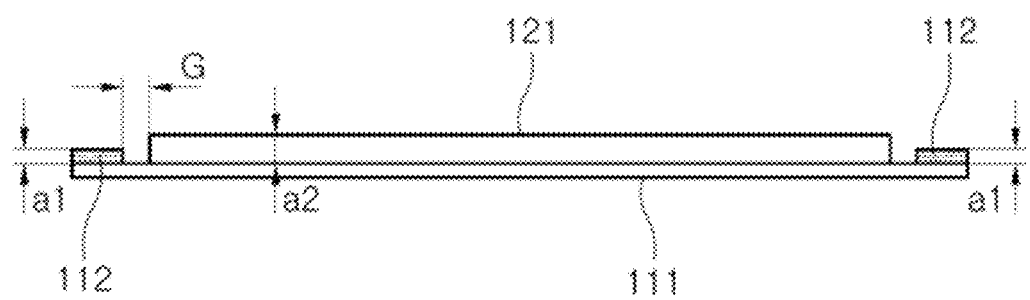
FIG. 2 is a vertical sectional view of FIG. 1.

FIG. 1 is an exploded perspective view showing an electrode and a separator according to an embodiment of the present invention, and FIG. 2 is a vertical sectional view of FIG. 1.

Referring to FIGS. 1 and 2, a separator 110 according to the present invention has a larger size than an electrode 120 and is configured to have a structure in which a separator substrate 111 and a coating part 112 are formed, the coating part 112 being formed on a surplus part, which is an outer periphery of the separator substrate 111 and is not in contact with the electrode 120.

The electrode 120 includes an electrode body 121 coated with an active material and an electrode tab 122 protruding to one side. The coating part 112 is disposed to surround an outer periphery of the electrode body 121, and a coating part is not formed on the separator substrate 111 overlapping the protruding electrode tab 122.

Therefore, the separator on which the coating part 112 is formed may serve to guide a position of the electrode 120, and may prevent positional tolerances in the stacking direction when a plurality of electrodes are stacked.

A thickness a1 of the coating part 112 may be the same as a thickness a2 of the electrode body 121. Alternatively, when the coating part can serve as a position guide for the electrode, the thickness a1 of the coating part 112 may be formed smaller than a thickness of the separator.

FIG. 2 shows a state in which a gap G between the electrode body 121 and the coating part 112 is formed to some extent. However, considering that the coating part serves to fix the position of the electrode, it is preferable that the gap G between the electrode body 121 and the coating part 112 is small. This applies equally to a gap between an electrode body and a coating part shown in FIGS. 4, 5, 7 and 8 below.

FIG. 1 shows a structure in which the coating part 112 is formed only on an upper surface of the separator substrate 111. However, unlike this, the coating part may be formed on each of the upper and lower surfaces of the separator substrate 111.

Figure 3:
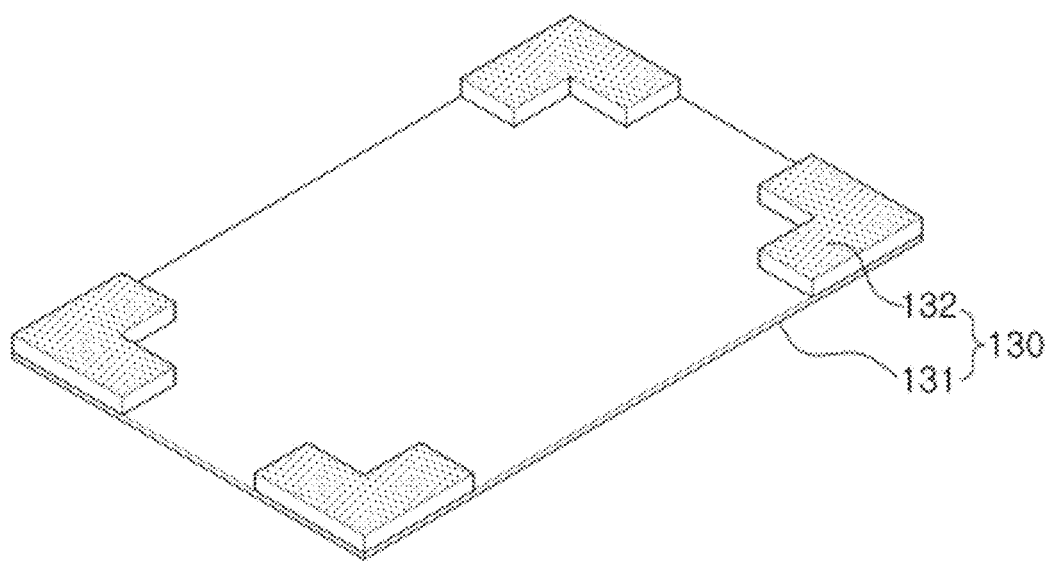
FIG. 3 is a perspective view showing a separator according to an embodiment of the present invention.

FIG. 3 is a perspective view showing a separator according to an embodiment of the present invention.

Referring to FIG. 3, when compared with the separator 110 of FIG. 1, a separator 130 of FIG. 3 is the same as the separator 110 of FIG. 1 in that it is composed of a separator substrate 131 and a coating part 132. However, unlike that the coating part 112 of FIG. 1 is formed on the entire outer periphery of the electrode body 121 except for the electrode tab 122, the coating part 132 is different in that it is formed only on surplus parts of outer peripheries of corner portions of the separator substrate 131. Since the coating part 132 of FIG. 3 is formed at portions corresponding to corners of the electrode body, the coating part 132 of FIG. 3 has the advantage of minimizing the resistance of the separator itself while serving to fix the position of the electrode.

FIG. 3 shows a structure in which the coating part 132 is formed only on an upper surface of the separator substrate 131. However, unlike this, the coating part may be formed on each of the upper and lower surfaces of the separator substrate 131.

Figure 4:
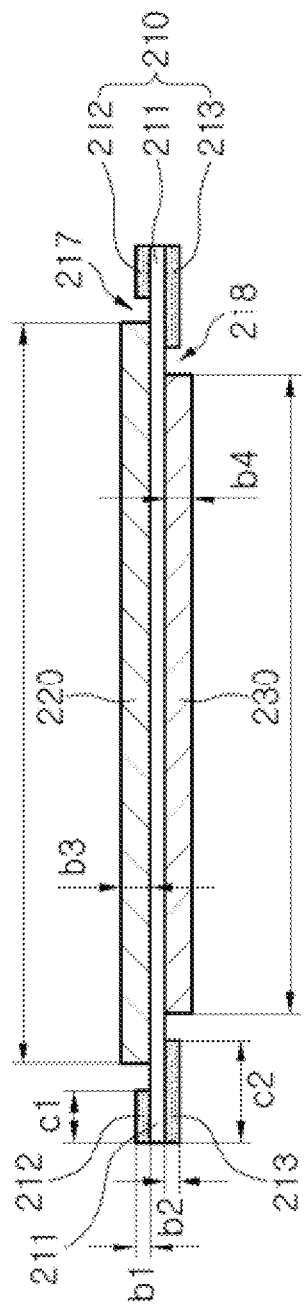
FIG. 4 is a vertical sectional view showing a first embodiment of an electrode assembly.

FIG. 4 is a vertical sectional view showing a first embodiment of an electrode assembly.

The sizes of positive electrode and negative electrode may be determined taking into account the capacity and cycle characteristics of a designed battery. However, considering that a negative electrode is formed relatively larger than a positive electrode when considering the irreversible property of lithium ions, the electrode assembly is configured to have a structure in which a negative electrode 220 is disposed on an upper surface of a separator 210 and a positive electrode 230 is disposed on a lower surface of the separator 210.

However, as described above, the positive electrode may be designed to be larger than the negative electrode. Of course, the large electrode positioned on the upper surface of the separator may be the positive electrode and the electrode positioned on the lower surface may be the negative electrode.

The separator 210 is configured to have a structure in which a coating part 212 is formed on an upper surface of a separator substrate 211 and a coating part 213 is formed on a lower surface of the separator substrate 211. Since the size of the negative electrode 220 is relatively larger than that of the positive electrode 230, a surplus part of an outer periphery of a negative electrode surface 217 of the separator substrate 211 is narrower than a surplus part of an outer periphery of a positive electrode surface 218 of the separator substrate 211. Therefore, a width c1 of the coating part 212 formed not to overlap with the negative electrode 220 is formed to be narrower than a width c2 of the coating part 213 formed not to overlap with the positive electrode 230.

The coating part 212 and the coating part 213 may include colored dyes, and the coating part 212 and the coating part 213 formed on the same separator substrate 211 may include the dyes of the same color.

A thickness b1 of the coating part 212 is equal to or smaller than a thickness b3 of the negative electrode 220, and a thickness b2 of the coating part 213 is equal to or smaller than a thickness b4 of the positive electrode 230. Since the thickness b3 of the negative electrode 220 and the thickness b4 of the positive electrode 230 may be different, the thickness b1 of the coating part 212 and the thickness b2 of the coating part 213 may not be the same.

Figure 5:
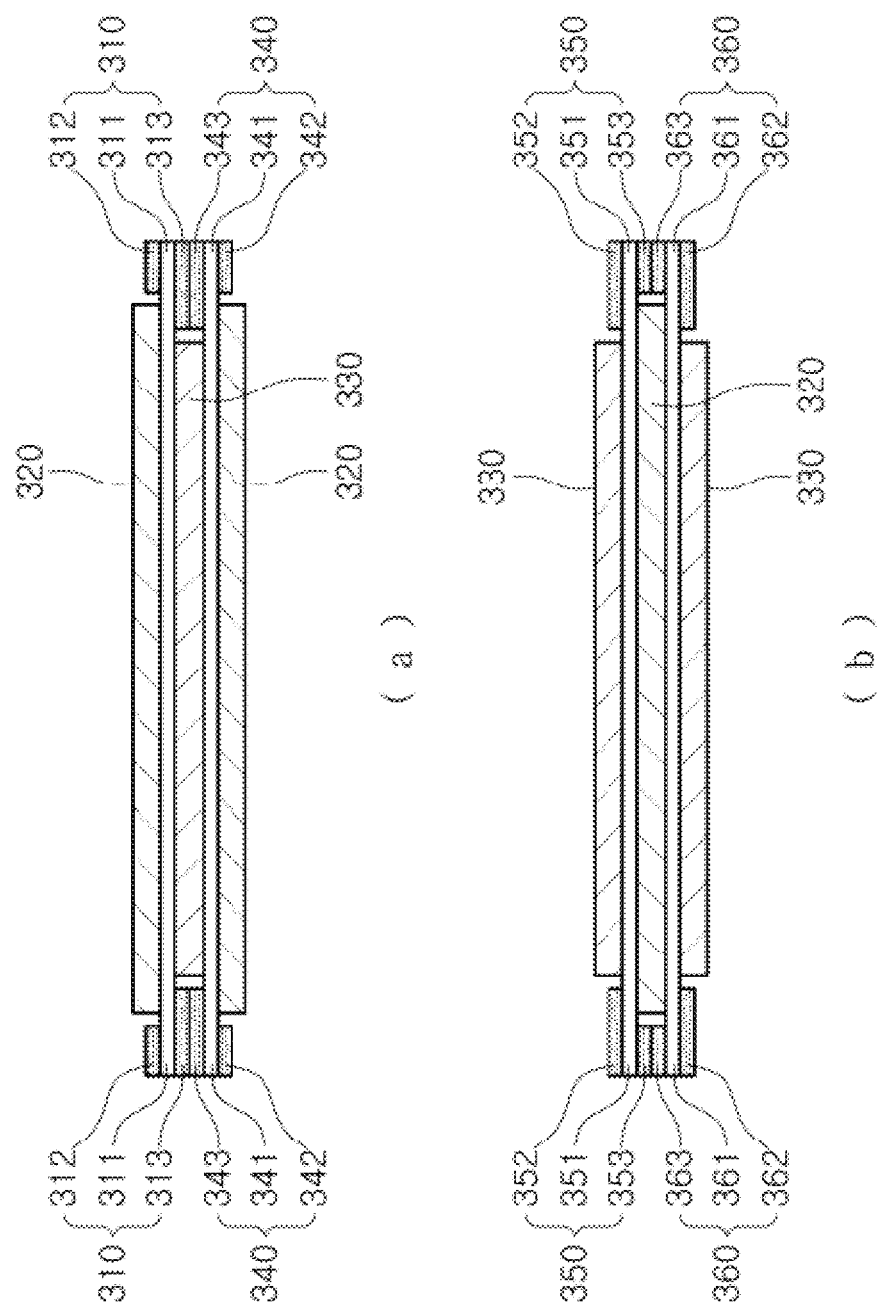
FIG. 5 is a vertical sectional view showing a second embodiment of an electrode assembly.

FIG. 5 is a vertical sectional view showing a second embodiment of an electrode assembly.

Referring to FIG. 5, (a) of FIG. 5 is an electrode assembly which is a C-type bi-cell configured to have a structure in which a negative electrode 320, a separator 310, a positive electrode 330, a separator 340, and a negative electrode 320 are sequentially stacked, and (b) of FIG. 5 is an electrode assembly which is a A-type bi-cell configured to have a structure in which a positive electrode 330, a separator 350, a negative electrode 320, a separator 360, and a positive electrode 330 are sequentially stacked.

Since the size of the negative electrode 320 is larger than the size of the positive electrode 330, a width of a coating part 312 formed on a surplus part of an outer periphery of a negative electrode surface that does not overlap with the negative electrode 320 in a separator substrate 311 is narrower than a width of a coating part 313 formed on a surplus part of an outer periphery of a positive electrode surface that does not overlap with the positive electrode 330 in the separator substrate 311. The same applies to the separator 340, so that a width of a coating part 342 formed on a surplus part of an outer periphery of a negative electrode surface that does not overlap with the negative electrode 320 in a separator substrate 341 is narrower than a width of a coating part 343 formed on a surplus part of an outer periphery of a positive electrode surface that does not overlap with the positive electrode 330 in the separator substrate 341.

In the electrode assembly (b) of FIG. 5, since the size of the negative electrode 320 is larger than the size of the positive electrode 330, a width of a coating part 353 formed on a surplus part of an outer periphery of a negative electrode surface that does not overlap with the negative electrode 320 in a separator substrate 351 is narrower than a width of a coating part 352 formed on a surplus part of an outer periphery of a positive electrode surface that does not overlap with the positive electrode 330 in the separator substrate 351. The same applies to the separator 360, so that a width of a coating part 363 formed on a surplus part of an outer periphery of a negative electrode surface that does not overlap with the negative electrode 320 in a separator substrate 361 is narrower than a width of a coating part 362 formed on a surplus part of an outer periphery of a positive electrode surface that does not overlap with the positive electrode 330 in the separator substrate 361.

In addition, since the coating part may include a resin that is cured by ultraviolet irradiation or heat, a coating part cured by ultraviolet irradiation or heating may be formed after forming the coating part.

As described above, since the coating part in a cured state is formed in a separator surplus part, it is possible to prevent the separator from being folded. In addition, the cured coating part is disposed so as to overlap with an end of an electrode of the relatively large size, so that the coating part serves to support the electrode of the relatively large size not to be bent in the direction of an electrode of the relatively small size during the laminating process of the electrode assembly. In addition, when the electrode is out of position and overlaps with the cured coating part, a significant difference occurs in the thickness change of the electrode assembly, and thus, it is possible to easily detect a defective electrode assembly by a method of measuring the thickness.

Since the coating part 313 and the coating part 343 are formed on a periphery of the positive electrode 330, widths of the coating part 313 and the coating part 343 are the same, and the sum of thicknesses of the coating part 313 and the coating part 343 may be equal to or less than a thickness of the positive electrode 330.

Since the coating part 312 and the coating part 342 are formed on a periphery of the negative electrode 320, widths of the coating part 312 and the coating part 342 are the same, and the sum of thicknesses of the coating part 312 and the coating part 342 may be equal to or less than a thickness of the negative electrode 320.

In addition, the coating part 313 may not be formed on the separator 310, and the coating part 343 of the separator 340 may be formed with the thickness of the positive electrode 330. Alternatively, the coating part 343 may not be formed on the separator 340, and the coating part 313 of the separator 310 may be formed with the thickness of the positive electrode 330.

The coating parts 312, 313, 342, and 343 may include colored dyes, and the coating parts formed on the same separator substrate may contain dyes of the same color. Thus, the colors of the coating part 312 and the coating part 313 may be the same as a first color, and the colors of the coating part 342 and the coating part 343 may be the same as a second color. However, the first color and the second color may be different colors.

Therefore, in a structure in which two separators are interposed between electrodes as shown in FIG. 5, when any one of the two separators is arranged to be misaligned out of its original position, the coating part of the misaligned separator is exposed. Thus, it is possible to identify whether the electrode assembly is aligned or not through a vision test measured at the top of the electrode assembly.

The electrode assembly (b) of FIG. 5 is configured to have a structure in which the positions of the positive electrode and the negative electrode are replaced in the electrode assembly (a), such that the separator 360 is applied to the position of separator 310, and the separator 350 is applied to the position of separator 340. The description of the separator substrate and the coating layer may be applied in the same manner as the description of the separator 310 and the separator 340 described above.

Figure 6:
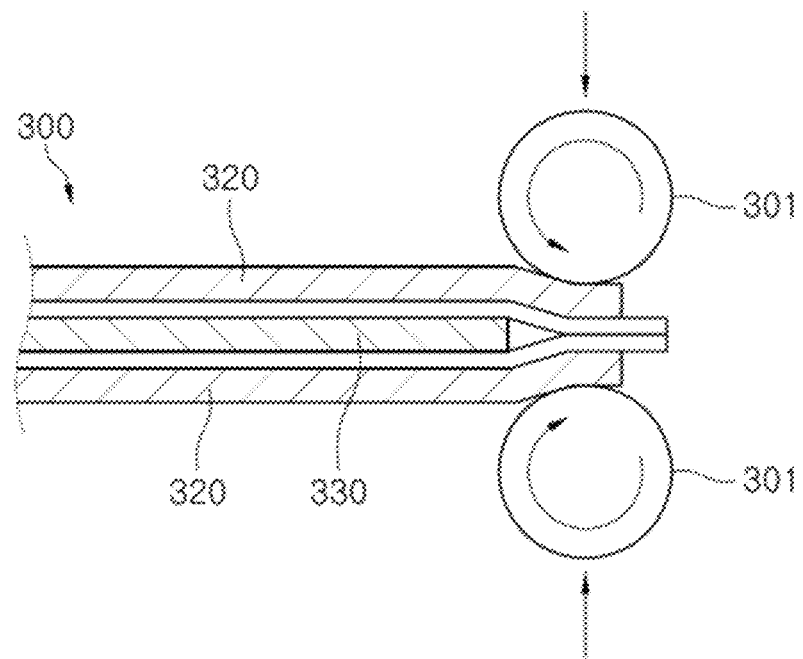
FIG. 6 is a vertical sectional view showing a conventional electrode assembly.

Meanwhile, FIG. 6 is a vertical sectional view showing a conventional electrode assembly. Referring to FIG. 6, when an electrode assembly 300 is rolled in a direction of an arrow using a rolling roller 301, there is a problem in that an end of the negative electrode 320 having a relatively large size is bent toward the positive electrode 330 having a relatively small size, due to the difference in size between the positive electrode 330 and the negative electrode 320.

However, when using the electrode assembly including the separator in which the coating part is formed on the surplus part of the outer periphery as in the present invention, the coating part serves to support end protrusions of the electrodes according to the difference in size between the positive electrode and the negative electrode. Thus, it is possible to prevent the electrode from being deformed, such as bending of the end of the electrode, as the outer periphery of the electrode is supported by the coating part.

FIG. 7 is a vertical sectional view showing a third embodiment of an electrode assembly.

Referring to FIG. 7, the electrode assembly (a) and the electrode assembly (b) have a form in which separators are added to outer surfaces of the outermost electrodes as compared with the electrode assembly (a) and the electrode assembly (b) of FIG. 5.

The added separators are configured to have a structure in which coating parts 372, 374, 382, and 384 are formed only on surfaces facing the electrodes in separator substrates 371, 373, 381, and 383. The width of the coating parts 372 and 374 is the same as the width of the coating parts 312 and 342, and the width of the coating parts 382 and 384 is the same as the width of the coating parts 352 and 362.

Since the outer peripheries of the separators in the electrode assembly are formed to align in the stacking direction, it can be easily confirmed that a separator is misaligned. Since the coating parts are in close contact with each other to form a stack, it is possible to prevent folding of the separator during the manufacturing process, and to prevent deformation of the separator by repeated expansion and shrinkage of the electrode assembly during the use of the battery. In addition, the supporting and protecting roles of the electrode in the stacking direction of the electrode assembly can also be expected.

FIG. 8 is a schematic view showing a process of manufacturing an electrode assembly.

Referring to FIG. 8, a separator substrate 421 and a separator substrate 441 are unwound and taken out. A negative electrode 410, which has been cut, is attached to an upper surface of the separator substrate 421 while maintaining a constant distance, and a negative electrode 430, which has been cut, is attached to a lower surface of the separator substrate 441 while maintaining a constant distance.

A coating part 422 is formed on an outer periphery of the negative electrode 410 by a resin sprayed from a coater 491. On a lower surface of the separator substrate 421 corresponding to the coating part 422 based on the separator substrate 421, a coating part 423 is formed on an outer periphery of a portion to which a positive electrode 450, which has been cut, is to be attached.

The width of the coating part 422 and the coating part 423 may be formed in different sizes depending on the size of the positive electrode 450 and the negative electrode 410. However, dyes included in the coating part 422 and the coating part 423 may be the same color, and the coating part 422 and the coating part 423 may include a material that is cured by ultraviolet irradiation or heating. Therefore, after passing through an ultraviolet light source 492, a coating part 422' and a coating part 423' developing a color in a cured state are formed.

A coating part 442 is formed on an outer periphery of the negative electrode 430 by a resin sprayed from the coater 491. On an upper surface of the separator substrate 441 corresponding to the coating part 422 based on the separator substrate 441, a coating part 443 is formed on an outer periphery of a portion to which the positive electrode 450, which has been cut, is to be attached.

The width of the coating part 442 and the coating part 443 may be formed in different sizes depending on the size of the negative electrode 430 and the positive electrode 450. However, dyes included in the coating part 442 and the coating part 443 may be the same color, and the coating part 442 and the coating part 443 may include a material that is cured by ultraviolet irradiation or heating. Therefore, after passing through the ultraviolet light source 492, a coating part 442' and a coating part 443' developing a color in a cured state are formed.

However, the color development of the coating part 422' and the coating part 423' may be formed differently from the color development of the coating part 442' and the coating part 443'.

Since the cut positive electrode 450 is disposed between the separator 420 and the separator 440, the cut positive electrode 450 is seated and attached to the inside of the coating part 423' and the coating part 443'.

As such, since the negative electrode 410, the separator 420, the positive electrode 450, the separator 440, and the negative electrode 430 form a stacked structure, the negative electrode 410, the separator 420, the positive electrode 450, the separator 440, and the negative electrode 430 are laminated while passing through a pair of rolling rollers 493. At this time, the coating parts 423' and 443' formed on the outer peripheries of the separators support ends of the negative electrodes 410 and 430 so as not to overlap with the positive electrode, and thus it is possible to prevent the ends of the negative electrodes 410 and 430 from being bent toward the positive electrode 450.

Those skilled in the art to which the present invention pertains will appreciate that various applications and modifications are possible based on the above description without departing from the scope of the present invention.

DESCRIPTION OF REFERENCE SYMBOLS 110, 130, 210, 310, 340, 350, 360, 420, 440: Separators
111, 131, 211, 311, 341, 351, 361, 371, 373, 381, 383, 421, 441: Separator substrates
112, 132, 212, 213, 312, 313, 342, 343, 352, 353, 362, 363, 372, 374, 382, 384, 422, 422', 423, 423', 442, 442', 443, 443': Coating parts
120: Electrode
121: Electrode body
122: Electrode tab
217: Negative electrode surface of separator substrate
218: Positive electrode surface of separator substrate
220, 320, 410, 430: Negative electrodes
230, 330, 450: Positive electrodes
300: Electrode assembly
301, 493: Rolling rollers
491: Coater
492: Ultraviolet light source
a1, b1, b2: Thicknesses of coating parts
a2: Thickness of electrode body
G: Gap between electrode body and coating part
b3: Thickness of negative electrode
b4: Thickness of positive electrode
c1, c2: Widths of coating parts

INDUSTRIAL APPLICABILITY

As described above, since the present invention has a coating film formed on a separator surplus part, the present invention provides an electrode assembly in which a separator is completely aligned in the vertical direction in a stacked state.

In addition, by arranging the separators such that the colors of the coating parts of the separators are alternately arranged, it is possible to solve a problem in which it is difficult to check the position of electrodes because the electrode having a relatively small area is obscured by the separator.

In addition, since the coating part including a curable resin is formed in the separator surplus part, it is easy to detect defects as the difference in the thickness change of the electrode assembly increases when an electrode deviates from the fixed position and overlaps with the cured coating part.

In addition, it is possible to prevent the electrode from being deformed in the rolling step of the electrode assembly due to a difference in size of neighboring electrodes by adding a coating part to a separator surplus part not in contact with the electrode.

Therefore, it is possible to prevent a problem in which an electrode mixture layer is separated from an electrode current collector due to deformation of an electrode, and it is possible to easily determine a defective electrode.

The invention claimed is:

1. An electrode assembly comprising:
   two or more electrodes, and
   two or more separators, each of the separators disposed between the electrodes,
   wherein each of the separators comprises; a separator substrate; and a coating part formed on corner portions of the separator substrate to serve for guiding a position of the electrode and having a color on a part of the separator substrate that is not in contact with the electrodes, and
   wherein the color of the coating part is different from a color of a coating part of a neighboring separator of the two or more separators.

2. The electrode assembly according to claim 1, wherein the coating part does not overlap with an immediately adjacent electrode of the two or more electrodes is formed only on the corner portions of the separator substrate.

3. The electrode assembly according to claim 1, wherein a thickness of the coating part is equal to or smaller than a thickness of an immediately adjacent electrode of the two or more electrodes.

4. The electrode assembly according to claim 1, wherein the separator has the coating part of the same color formed on both sides of the separator.

5. The electrode assembly according to claim 1, wherein the coating part comprises a material that is cured by ultraviolet irradiation or heat.

6. The electrode assembly according to claim 1, wherein the coating part is disposed on an upper surface of the separator substrate.

7. The electrode assembly according to claim 1, wherein the coating part is disposed on a lower surface of the separator substrate.

8. The electrode assembly according to claim 1, wherein the coating part is disposed to surround an outer periphery of an immediately adjacent electrode of the two or more electrodes.

9. The electrode assembly according to claim 1,
wherein the electrode assembly comprises one or more unit cells,
the electrodes include positive electrodes and negative electrodes,
the separators include a first separator and a second separator,
each of the unit cell comprises:
a C-type bi-cell composed of one of the negative electrodes, the first separator, one of the positive electrodes, the second separator and another one of the negative electrodes; and
an A-type bi-cell composed of one of the positive electrodes, the second separator, one of the negative electrodes, the first separator and another one of the positive electrodes.

10. A method of manufacturing an electrode assembly according to claim 1, comprising:
(a) cutting a first electrode of the two or more electrodes;
(a-1) binding the first electrode with an interval to a first surface of a first separator substrate of the two or more separators, which is unwound;
(b) curing after coating a first coloring material on a part of the first surface of the first separator substrate which is not in contact with the first electrode;
(c) simultaneously with step (a), cutting a second electrode of the two or more electrodes;
(c-1) simultaneously with step (a-1), binding the second electrode with an interval to a second surface of a second separator substrate of the two or more separators, which is unwound;
(d) simultaneously with step (b), curing after coating a second coloring material on a part of the second surface of the second separator substrate which is not in contact with the second electrode;
(e) simultaneously with steps (b) and (d), curing after locating a position corresponding to the first electrode on a second surface of the first separator substrate and coating a third coloring material on a part of the second surface of the first separator substrate that is not in contact with a third electrode disposed in step (g);
(f) simultaneously with steps (b) and (d), curing after locating a position corresponding to the second electrode on a first surface of the second separator substrate and coating a fourth coloring material on a part of the first surface of the second separator substrate that is not in contact with the third electrode disposed in step (g);
(g) cutting the third electrode;
(g-1) disposing the third electrode in an uncoated region of the second surface of the first separator substrate and an uncoated region of the first surface of the second separator substrate;
(h) compressing the first electrode, the first separator, the third electrode, the second separator, and the second electrode; and
(i) manufacturing a unit cell by cutting in coating regions of the first separator and the second separator, wherein
steps (e) and (f) are both or alternatively performed.

11. The method of manufacturing the electrode assembly according to claim 10,
wherein a total thickness of the third and fourth coloring materials prepared in steps (e) and (f) is equal to a thickness of the third electrode.

12. The method of manufacturing the electrode assembly according to claim 10, wherein only one of steps (e) or (f) is performed, and a coating thickness is equal to a thickness of the third electrode.

13. The method of manufacturing the electrode assembly according to claim 10, wherein the third electrode is a negative electrode when the first electrode and the second electrode are positive electrodes, or the third electrode is a positive electrode when the first electrode and the second electrode are negative electrodes.

14. The method of manufacturing the electrode assembly according to claim 10,
wherein a total area of the first separator and the second separator is the same,
an area of the third electrode is smaller than an area of the first electrode and the second electrode, and
an area of a virtual surplus part of steps (e) and (f) is larger than an area of a surplus part of steps (b) and (d).

* * * * *